(12) United States Patent
Cho

(10) Patent No.: US 6,307,596 B1
(45) Date of Patent: Oct. 23, 2001

(54) CIRCUIT AND METHOD FOR INDICATING IMAGE ADJUSTMENT PATTERN USING OSD

(75) Inventor: Jae-Hak Cho, Kyungki-do (KR)

(73) Assignee: Samusung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/085,222

(22) Filed: May 27, 1998

(30) Foreign Application Priority Data

May 27, 1997 (KR) .................................................. 97-20946

(51) Int. Cl.[7] .......................... H04N 17/00; H04N 17/02
(52) U.S. Cl. ........................ 348/563; 348/56.9; 348/177; 348/180; 348/184; 348/189; 345/116; 345/117
(58) Field of Search .................................... 348/563, 569, 348/570, 564, 180, 181, 177–184, 189–192; 345/116, 117, 904, 132; H04N 17/00, 17/02

(56) References Cited

U.S. PATENT DOCUMENTS

| 4,769,703 | * | 9/1988 | Osborne et al. ...................... 348/189 |
| 5,359,543 | * | 10/1994 | Na ......................................... 348/178 |
| 5,493,317 | * | 2/1996 | Kim ...................................... 345/213 |
| 5,493,340 | * | 2/1996 | Kim ...................................... 348/569 |
| 5,541,647 | * | 7/1996 | Moon .................................... 348/180 |
| 5,734,423 | * | 3/1998 | Wakabayashi ....................... 348/189 |
| 5,790,189 | * | 8/1998 | Moon .................................... 348/189 |
| 5,956,022 | * | 9/1999 | Cheng .................................. 345/213 |
| 5,963,266 | * | 10/1999 | Fujimori .............................. 348/511 |
| 5,995,162 | * | 11/1999 | Fujimori .............................. 348/569 |
| 6,002,449 | * | 12/1999 | Tsyrganovich ....................... 348/725 |
| 6,037,978 | * | 3/2000 | Kim ...................................... 348/194 |
| 6,211,922 | * | 4/2001 | Jun ....................................... 348/569 |
| 6,215,467 | * | 4/2001 | Suga et al. ........................... 345/132 |
| 6,226,047 | * | 5/2001 | Ryu ...................................... 348/569 |

* cited by examiner

Primary Examiner—Michael Lee
Assistant Examiner—Linus H. Lo
(74) Attorney, Agent, or Firm—Robert E. Bushnell, Esq.

(57) ABSTRACT

A circuit and method for indicating an image adjustment pattern using an on-screen display (OSD), includes: a microcomputer for selectively generating a free running frequency or converting the free running frequency into a standard mode frequency and generating a frequency output and video data according to the frequency converted; an OSD control circuit for receiving the frequency output from the microcomputer, and generating an OSD gain signal in accordance with a signal cable check request and an image adjustment pattern OSD gain signal according to the frequency output; a signal processing circuit for receiving and processing the video data according to the frequency output from the microcomputer, and thus outputting a video signal; and a video mixer for mixing the video signal output from the signal processing circuit and the OSD gain signal selectively output from the OSD control circuit, and outputting a signal cable check request video signal and an image adjustment pattern video signal.

14 Claims, 5 Drawing Sheets

CIRCUIT AND METHOD FOR INDICATING IMAGE ADJUSTMENT PATTERN USING OSD

CLAIM OF PRIORITY

This application makes reference to, incorporates the same herein, and claims all benefits accruing under 35 U.S.C. §119 from an application for CIRCUIT AND METHOD OF INDICATING IMAGE ADJUSTMENT PATTERN USING OSD earlier filed in the Korean Industrial Property Office on the 27$^{th}$ day of May 1997 and there duly assigned Ser. No. 20946/1997.

BACKGROUND OF THE INVENTION

1. Technical Field

The present invention relates to a circuit and method for indicating an image adjustment pattern using an on-screen display (OSD), and more particularly to a circuit and method for voluntarily indicating an image adjustment pattern in a standard mode, using OSD built into a display.

2. Related Art

Generally, a display with which a microcomputer is used adjusts an image in production, and then stores it in a memory. Using the image data kept in the memory, a signal input outside the display is analyzed, and video information in accordance with the result analyzed is compensated for and displayed on a screen.

Prior arrangements are burdened by a problem which arises when servicing away a display is required during its use. Once services is performed and the problem is eliminated, the image displayed after removing the problem must be adjusted. This is particular true when the microcomputer and display unit is replaced, and that new image adjustment data must be input thereto. Such input of new image adjustment data requires a signal generator to be utilized to produce an image adjustment pattern which is then applied to the display unit to adjust the image displayed on the cathode ray tube (CRT) thereof.

If there is no signal generator, present or available for generating an image adjustment pattern, then the image displayed on the display unit is controlled using an image adjustment pattern produced in the main computer. However, an image controlled in this manner can not be all-mode saved in the microcomputer. Thus, without a signal generator, image adjustment can be implemented.

Therefor, there is a need for the development of a circuit and method for indicating an image adjustment pattern using an on-screen display(OSD). In particularly, there is a need for development of a circuit or method for indicating an image adjustment pattern using a free running frequency for representing a check signal cable in an OSD function of a display.

SUMMARY OF THE INVENTION

Therefore, in order to overcome such drawbacks of the prior art, an objective of the present invention is to provide a circuit and method for indicating an image adjustment pattern using a free running frequency for representing a check signal cable in OSD function of a display.

To accomplish the objective of the present invention, there is provided a circuit for indicating image adjustment pattern using OSD, comprising: a microcomputer which, if there is no externally input signal, generates a free running frequency, or converts the free running frequency into a standard mode frequency according to a key signal applied from a key panel, and generates video data according to the frequency converted; an OSD control circuit for receiving the frequency output from the microcomputer, and generating an OSD gain signal in accordance with a signal cable check request and an image adjustment pattern OSD gain signal for indicating the image adjustment pattern according to the frequency applied; a signal processing circuit for receiving and processing the video data according to the frequency generated from the microcomputer, and thus outputting a video signal; and a video mixer for mixing the video signal output from the signal processing circuit and the OSD gain signal selectively output from the OSD control circuit, and for outputting a signal cable check request video signal and image adjustment pattern video signal.

For another aspect of the present invention, there is provided a method of indicating an image adjustment pattern using OSD, comprising the steps of: (a) inputting a key signal for frequency mode conversion; (b) generating a free running frequency if there is no external input signal; (c) converting the free running frequency generated in step (b) into a standard mode frequency according to the key signal selected in step (a); (d) controlling steps (b) and (c) according to the presence or absence of the key signal output from step (a), in order to determine the output of the free running frequency and standard mode frequency; (e) generating an OSD gain signal in accordance with signal cable check according to the free running frequency output from step (d); (f) generating an OSD gain signal in accordance with an image adjustment pattern according to the standard mode frequency output from step (d); and (g) receiving the frequency output from step (d), controlling steps (e) and (f), and determining whether or not to generate the OSD gain signal in accordance with cable check and the OSD gain signal and in accordance with the image adjustment pattern.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Hereinafter, a preferred embodiment of the present invention will be described with reference to the attached drawings.

Figure 1:
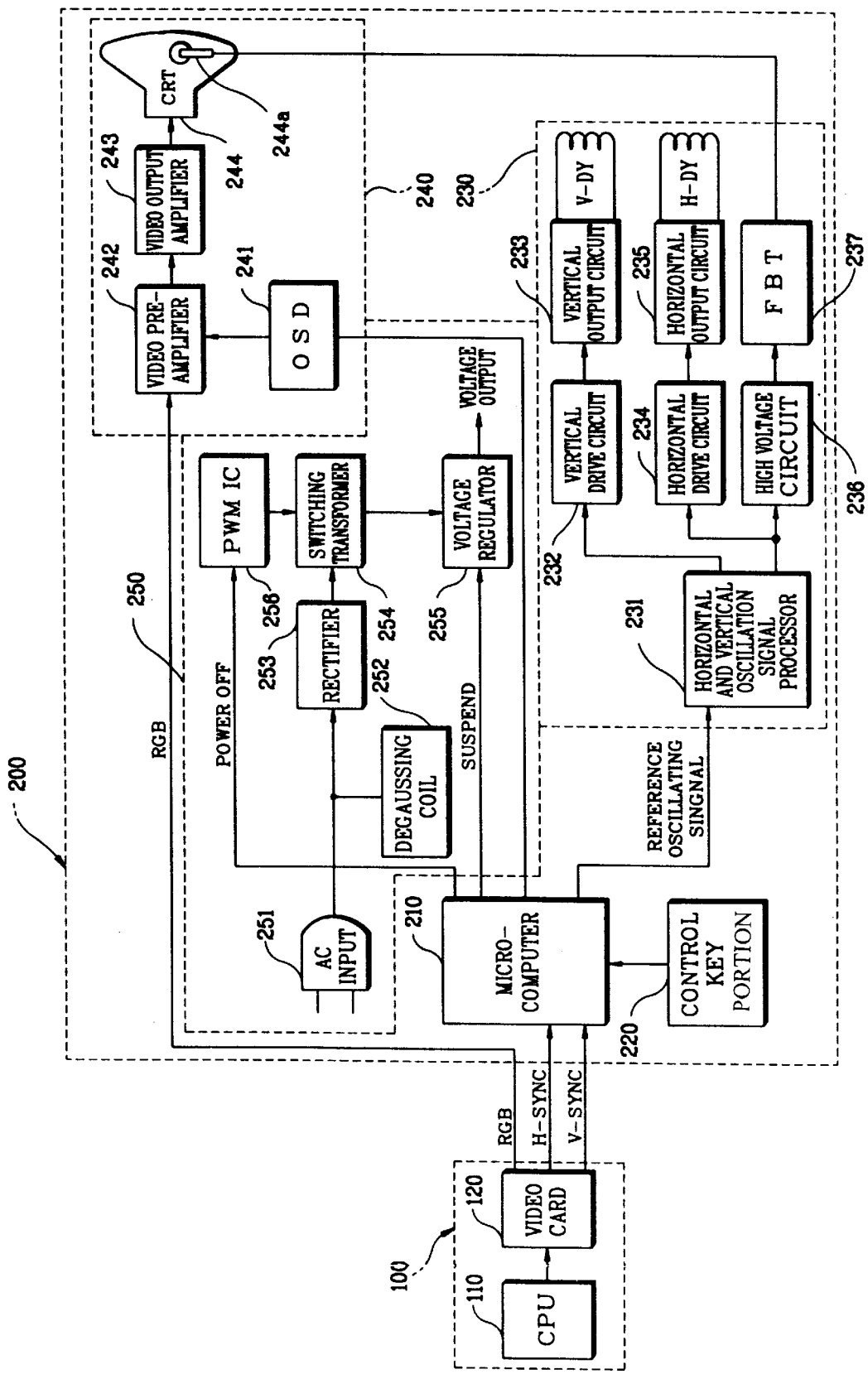
FIG. 1 is a block diagram of the internal circuits of a display.

FIG. 1 is a block diagram of the internal circuits of a display unit. As shown in this drawing, computer 100 includes a CPU 110 for processing a keyboard signal and for generating data in accordance with the processed result, a video card 120 for processing data output from the CPU 110 to provide video signals R,G,B, and for outputting horizontal and vertical sync signals H-SYNC and V-SYNC, respectively, for synchronizing video signals R,G,B.

A display 200, which accepts video signals R,G,B from the video card 120 disposed in computer 100 and horizontal and vertical sync signals H-SYNC and V-SYNC, respectively, includes: a microcomputer 210 for receiving the horizontal and vertical sync signals H-SYNC and V-SYNC, respectively, to determine the resolution; a control key portion 220 for generating and outputting an image adjustment signal for controlling the display screen of display 200; a horizontal/vertical output circuit portion 230 for receiving a display image adjustment signal and a reference oscillation signal output from microcomputer 210 to synchronize raster; a video circuit portion 240 for receiving and amplifying video signals R,G,B output from video card 120; and a power circuit portion 250 for supplying a driving voltage to microcomputer 210, horizontal/vertical output circuit portion 230, and video circuit portion 240.

Each of the blocks of display 200 will be described below in more detail.

The horizontal and vertical sync signals H-SYNC and V-SYNC, respectively, output from video card 120 of computer 100 are applied to microcomputer 210. Then, microcomputer 210 outputs the reference oscillation signal and the image adjustment signal supplied from control key portion 220 to control an image displayed on the screen.

A horizontal/vertical oscillation signal processor 231 of the horizontal/vertical output circuit portion 230, which receives the image adjustment signal and the reference oscillation signal output from microcomputer 210, applies a vertical pulse to a vertical drive circuit 232. The vertical pulse controls the switching speed of the ON/OFF operation of a sawtoothwave generator according to the horizontal and vertical sync signals H-SYNC and V-SYNC, respectively, applied from video card 120.

Vertical drive circuit 232 which receives the vertical pulse is, preferably, a one-stage vertical amplification type or an emitter follower type in which the input is applied through the base of a transistor and the output voltage is output from the emitter. Thus, the circuit 232 acts to improve linearity rather than gain.

A vertical output circuit 233, receiving the drive current amplified and output from vertical drive circuit 232, generates a sawtoothwave current coincide with the vertical sync pulse running through vertical deflection coil V-DY, and determines the vertical scanning period according to the sawtoothwave current generated. A horizontal drive circuit 234, which receives the horizontal oscillation signal output from horizontal/vertical oscillation signal processor 231, generates a drive current for ON/OFF of horizontal output circuit 235.

The horizontal output circuit 235, receiving the drive current output from horizontal drive circuit 234, provides a sawtoothwave current to horizontal deflection coil H-DY in order to determine the horizontal scanning period. Such driving mode of horizontal drive circuit 234, provides includes an in-phase (same polarity) mode where the output stage is ON when the drive stage is ON, and a currently popular anti-phase (opposite polarity) mode where the output stage is OFF when the drive stage is ON.

In order to supply a stable DC voltage to anode port 244*a* of cathode ray tube (CRT) 244, a high voltage is produced through high-voltage circuit 236 and flyback transformer (FBT) 237. Using a harmonic wave in accordance with the inductance and distribution capacity, high-voltage circuit 236 and FBT 237 produce a high voltage which, in turn, has a small collector pulse. The high voltage generated is applied to anode port 244*a* of CRT 244. Through the anode port 244*a* receiving the high voltage, a high voltage is formed on the anode of CRT 244.

Meanwhile, video circuit portion 240 receives OSD data from microcomputer 210 through OSD IC 241 according to a user's selection. OSD IC 241 receives and processes the OSD data to generate an OSD gain signal. The OSD gain signal from OSD IC 241 is sent to video pre-amplifier (or pre-AMP) 242.

The video pre-AMP 242, receiving the OSD gain signal, accepts the video signals R,G,B output from video card 120. Then, video pre-AMP 242 amplifies the low video signals R,G,B or OSD gain signal using a low-voltage amplifier according to the user's selection so that they maintain a predetermined level of voltage. For instance, a signal below 1 peak-to-peak voltage (Vpp) is amplified to 4–6Vpp. The video signals R,G,B or OSD gain signal amplified to 4–6Vpp are received in video output amplifier (or AMP) 243 and re-amplified to 40–60Vpp. They are then sent to the respective pixels of the screen of CRT 244 to produce an image.

The scanning period of the image displayed by CRT 244 in accordance with the video signals R,G,B or OSD signal is determined by the deflection yokes H-DY and V-DY so that it is indicated as a visible image on the screen of CRT 244. The luminance of the video signals R,G,B or OSD signal amplified in video output AMP 243 is controlled by the high voltage formed on the anode of CRT 244.

A power circuit portion 250 for supplying a driving voltage to supply/display video signals R,G,B to/on the display screen receives alternate current through AC input port 251. The AC supplied through AC input port 251 is accepted in degaussing coil 252 so that colors blurred due to the terrestrial field or other exterior conditions are recovered to the original.

For instance, when the AC is instantly applied to degaussing coil 252 for 2–5 seconds, the DC magnetic field formed on the shadow mask of CRT 244 is scattered. This prevents stable deflection caused by the DC magnetic field during electron beam deflection so that blurred color is recovered.

The AC supplied through AC input port 251 is rectified in rectifier 253, and then applied to switching transformer 250-4. The switching transformer 254 receives the DC rectified in rectifier 253, and outputs various driving voltages required in display 200 through voltage regulator 255. Switching transformer 254's ON/OFF is controlled by PWM IC 256 so that the output voltages are stabilized.

A display power management signaling (DPMS) mode for reducing power consumed in display 200 is controlled in microcomputer 210. Specifically, microcomputer 210 reduces power taken in display 200 by outputting a power off mode or suspend mode whether horizontal or vertical sync signal H-SYNC or V-SYNC, respectively, is detected.

Figure 2:
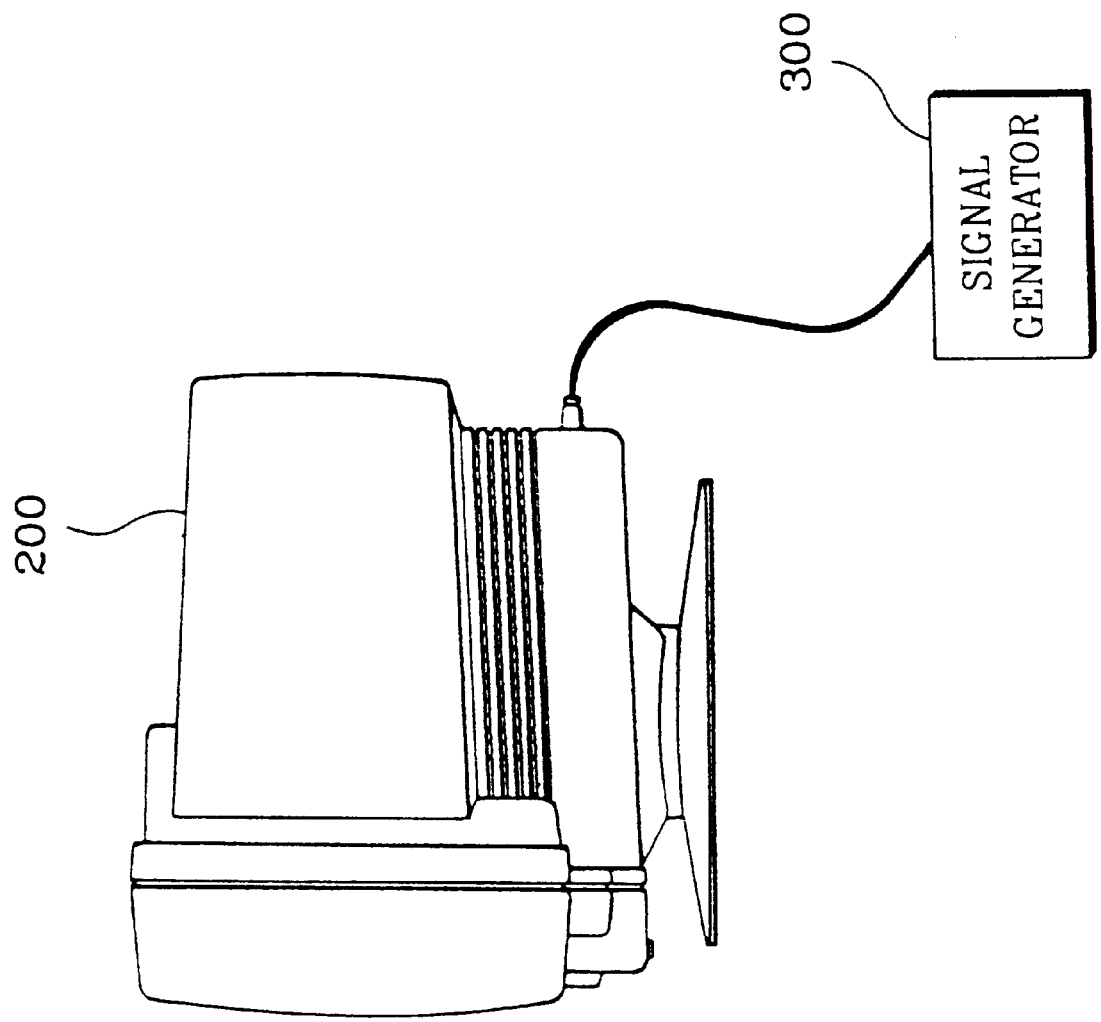
FIG. 2 shows a state of performing image adjustment in a display during servicing.

If there is a problem during the use of display 200 and its servicing is performed, the image displayed after removing the problem is adjusted. Especially, when microcomputer 210 is replaced, new image adjustment data are input thereto. In order to input the image adjustment data, as shown in FIG. 2, signal generator 300 produces an image adjustment pattern, which is applied to display 200 to adjust the image displayed on the CRT 244. The adjusted image data is converted into a digital signal, and is stored in an EEPROM (not shown) placed inside or outside of the microcomputer replaced.

If there is no signal generator 300 for generating an image adjustment pattern, after the replacement of microcomputer 210, the image displayed on the display 200 is controlled using the image adjustment pattern produced in the computer. The image controlled in this manner cannot be all-mode saved in the microcomputer 210. For this reason, without the signal generator 300, image adjustment is not substantially implemented.

Figure 3:
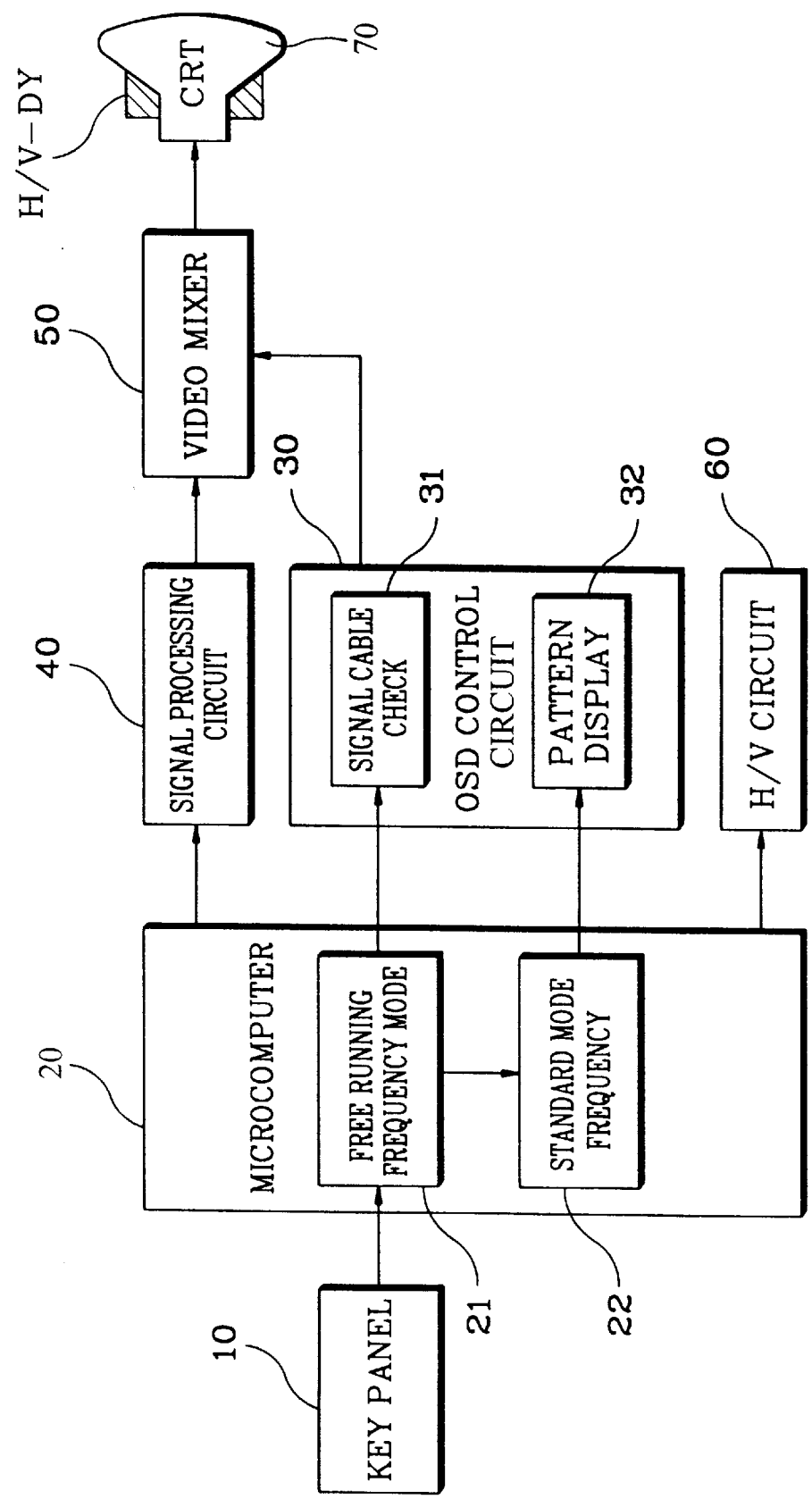
FIG. 3 is a block diagram of internal circuits of a display with an image adjustment pattern function in accordance with the present invention.

Referring to FIG. 3, the display of the present invention comprises: a key panel 10 for generating a key signal in accordance with a user's selection; a microcomputer 20 for generating a free running frequency when a signal is not input outside the display, or converting the free running frequency into a standard mode frequency according to the key signal applied from key panel 10 and producing video data according to the frequency converted; an OSD control circuit 30 for receiving the frequency output from microcomputer 20, and generating an OSD gain signal in accordance with the request of signal cable check and an image adjustment pattern OSD gain signal for indicating the image adjustment pattern according to the frequency applied; a signal processing circuit 40 for processing video data output according to the frequency produced from microcomputer 20, and then outputting a video signal; a video mixer 50 for mixing the video signal output from signal processing circuit 40 and the OSD gain signal selectively output from OSD control circuit 30, and then outputting a signal cable check request video signal and an image adjustment pattern video signal; a horizontal/vertical circuit 60 for receiving the horizontal and vertical signals output from microcomputer 20, and providing a sawtoothwave current to the horizontal and vertical deflection yokes H-DY and V-DY, respectively; and a CRT 70 for receiving the signal cable check request video signal and image adjustment pattern video signal selectively output from video mixer 50, and indicating them according to the cycle of the sawtoothwave current running through the horizontal and vertical deflection yokes H-DY and V-DY, respectively.

In this construction, microcomputer 20 comprises a free running frequency mode portion 21 for generating a free running frequency if there is no signal externally applied to the display, and a standard mode frequency portion 22 for converting the free running frequency into standard mode frequency if a key signal for converting the frequency is applied from key panel 10 during the operation of the free running frequency mode portion 21.

The OSD control circuit 30 is composed of a signal cable check portion 31 for processing the free running frequency output from microcomputer 20 to generate the OSD gain signal in accordance with a request of signal cable check, and a pattern display 32 for receiving the standard mode frequency output from microcomputer 20 to generate the image adjustment pattern OSD gain signal. The operation of the above-explained construction will be described below.

When no external signal is applied to the display and a user selects a key using key panel 10, the free running frequency is produced according to the key selected. The free running frequency produced from free running frequency mode portion 21 of microcomputer 20 according to the key signal output from key panel 10 is accepted in signal cable check portion 31 of OSD control circuit 30.

The signal cable check portion 31 of OSD control circuit, receiving the free running frequency signal, executes a program for producing the OSD signal in accordance with a signal cable check request according to the free running frequency applied. When the program runs, an OSD gain signal corresponding to the signal cable check request is produced.

Here, the OSD gain signal corresponding to the signal cable check request is information confirming to the user whether the externally signal receiving cable is normally connected when there is trouble during the use of the display or the initial installation thereof. The OSD gain signal corresponding to the signal cable check request produced by OSD control circuit 30 is accepted in video mixer 50.

The video mixer 50, receiving the OSD gain signal in accordance with signal cable check request, also receives video data in accordance with the signal cable check request produced by microcomputer 20 and processed in video processing circuit 40.

The OSD gain signal output from OSD control circuit 30 and the video signal corresponding to the OSD cable check request output from signal processing circuit 40 are mixed in video mixer 50 and applied to the CRT 70 for display.

Microcomputer 20 processes the horizontal and vertical oscillation pulses through horizontal/vertical circuit 60 so that horizontal and vertical sawtoothwave currents are produced in the horizontal and vertical deflection yokes H-DY and V-DY, respectively. The horizontal and vertical sawtoothwave currents produced by horizontal and vertical deflection yokes H-DY and V-DY, respectively, deflect the OSD signal in accordance with OSD cable check request.

Meanwhile, when the key signal for converting the free running frequency into standard mode frequency is generated in key panel 10, standard mode frequency portion 22 of microcomputer 20 alters the free running frequency into the standard mode frequency.

When this happens in standard mode frequency portion 22, the standard mode frequency is applied to pattern display 32 of OSD control circuit 30. Then, pattern display 32 executes a pattern display program for producing the image adjustment pattern OSD signal according to the standard mode frequency applied.

The image adjustment pattern OSD gain signal generated in OSD control circuit 30 is fed to video mixer 50. Video mixer 50 receives the image adjustment pattern OSD gain signal and also accepts the image adjustment pattern data output from microcomputer 20 as processed in signal processing circuit 50.

The image adjustment pattern OSD gain signal and image adjustment pattern signal applied to video mixer 50 are mixed therein and are applied to the CRT 70.

In order to display the image adjustment pattern signal fed to the CRT 70, an oscillation pulse output from microcomputer 20 is accepted in horizontal/vertical circuit 60. The horizontal/vertical circuit 60 receiving the oscillation pulse output from microcomputer 20 provides the horizontal and vertical sawtoothwave currents to horizontal and vertical deflection yokes H-DY and V-DY, respectively, according to the oscillation pulse.

The horizontal and vertical sawtoothwave currents produced by horizontal and vertical deflection yokes H-DY and V-DY, respectively, deflect the image adjustment pattern signal and the OSD signal in accordance therewith as applied to the CRT 70 so that they are displayed on the screen. As explained above, using the image adjustment pattern OSD screen displayed on the CRT 70, the image can be controlled without externally input signal. In FIG. 3, the frequency signal output from microcomputer 20 is applied to OSD control circuit 30 using two ports. However, one port also allows the signal to be applied to OSD control circuit 30.

The operation of microcomputer 20 in accordance with the frequency conversion and performance of image adjustment pattern OSD will be described below with reference to the attached drawings.

Figure 4:
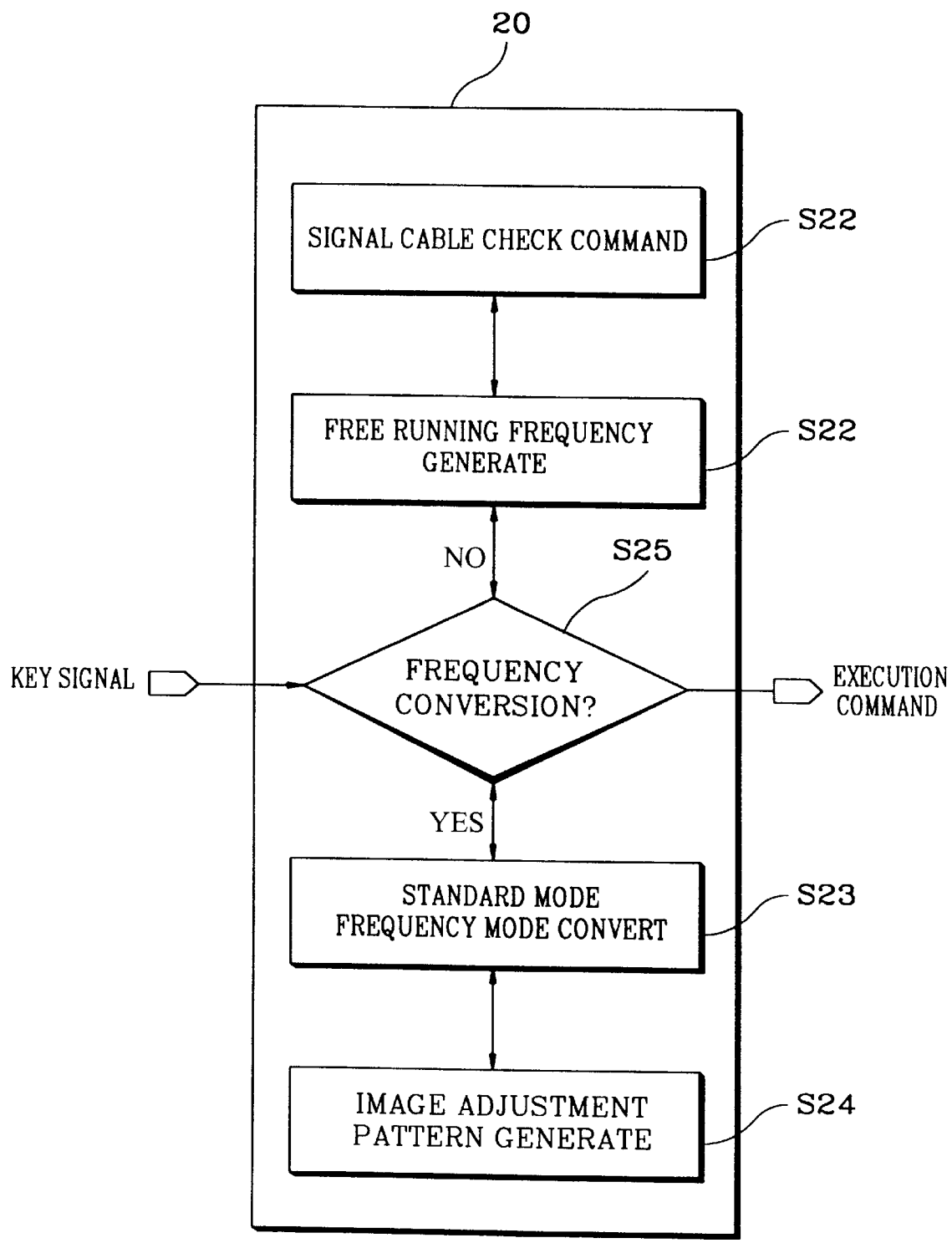
FIG. 4 is a flowchart showing the operation of the microcomputer shown in FIG. 3.

Referring to FIG. 4, the operation of microcomputer 20 comprises: step S21 of generating the free running frequency when no signal is input outside the display; step S22 of controlling signal cable check when the free running frequency is generated in step S21; step S23 of converting the free running frequency mode into the standard mode frequency when a frequency conversion key signal is applied from key panel 10 (in FIG. 3) while the free running frequency is generated in step S21; step S24 of generating an image adjustment pattern when the standard mode frequency conversion is performed in step S23; and step S25 of deciding whether the key signal output from key panel 10 is input or not.

The above operation is explained below in more detail.

When there is no external input signal in the display, the free running frequency is generated in step S21. When this happens, microcomputer 20 produces video data in accordance with signal cable check. The step S21 is controlled in step S25 of frequency conversion.

In step S25, the free running frequency is generated by controlling the free running frequency generation step S21 when there is no signal input outside the display. When the free running frequency is generated in step S21, step S25 controls the generation of video data for indicating "signal cable check" through step S22. When there is no supply of signal in accordance with the video signal externally input from the display, microcomputer 20 generates the free running frequency according to the execution command of indicating "signal cable check". The free running frequency controls OSD control circuit 30, outputting the OSD gain signal in accordance with signal cable check.

When the key signal for selecting the image adjustment pattern is applied from key panel 10 (in FIG. 3), step S25 controls step S23 of frequency conversion into standard mode frequency according to the key signal applied. The step S23 controlled by step S25 converts the free running frequency into the standard mode frequency. According to the converted standard mode frequency, the image adjustment pattern is generated in step S24.

When the image adjustment pattern is generated in step S24, the image adjustment data are applied to signal processing circuit 40. When the standard mode frequency is generated in step S24, it is fed to OSD control circuit 30. The OSD control circuit 30 receives the standard mode frequency and generates the OSD gain signal in accordance with an image adjustment pattern.

A method of generating the image adjustment pattern under the control of microcomputer 20 will be described below referring to the attached drawing.

Figure 5:
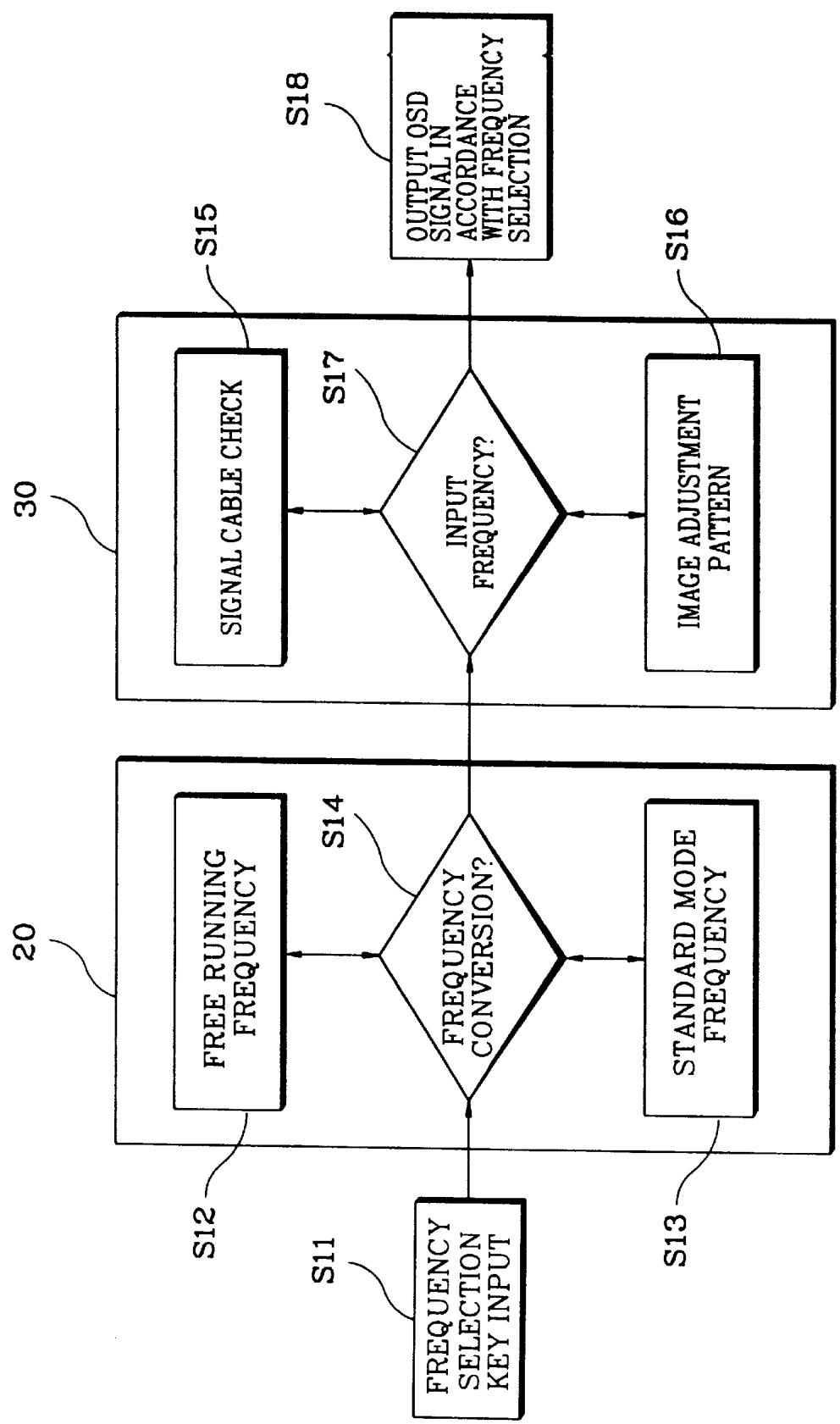
FIG. 5 is a flowchart showing a method of indicating an image adjustment pattern in accordance with the present invention.

Referring to FIG. 5, a method of indicating the image adjustment pattern of the present invention comprises: step S11 of inputting the key signal for frequency mode conversion; step S12 of generating the free running frequency when no signal is input externally from the display; step S13 of converting the free running frequency generated in step S12 into the standard mode frequency according to the key signal selected in step S11; step S14 of controlling step S12 and step S13 according to the presence or absence of the key signal output from step S11 to decide the output of the free running frequency and standard mode frequency; step S15 of generating the OSD gain signal in accordance with signal cable check, depending upon the free running frequency output in step S14; step S16 of generating the OSD gain signal in accordance with the image adjustment pattern, depending upon the standard mode frequency output in step S14; step S17 of receiving the frequency output in step S14, and thus controlling steps S15 and S16 to decide the generation of the OSD gain signal in accordance with cable check and the OSD gain signal in accordance with image adjustment pattern; and step S18 of outputting the OSD gain signal produced according to the result decided in step S17. The above-explained operation will be described below in more detail.

In step S11, the key signal for indicating the image adjustment pattern is generated. Microcomputer 20 decides in step S14 whether the key signal for image adjustment pattern is selected in step S11.

If there is no key signal input in step S14 and no signal externally input from the display, the free running frequency is generated in step S12. Here, microcomputer 20 generates the previously stored video data in accordance with signal cable check as well as the free running frequency, and then applies them to signal processing circuit 40. Signal processing circuit 40 processes the video data in accordance with signal cable check output from microcomputer 20, and outputs the video signal to video mixer 50.

The free running frequency output in step S14 is sent to step S17 performed in OSD control circuit 30. Step S17 generates the OSD gain signal in accordance with signal cable check for indicating information "signal cable check" on the OSD screen through step S15.

The OSD gain signal in accordance with signal cable check generated in step S15 is applied to video mixer 50 through step S18. Video mixer 50 (in FIG. 3) mixes the video signal and OSD gain signal in accordance with signal cable check output from signal processing circuit 40 and OSD control circuit 30, respectively, and applies the mixed result to the CRT 70. Here, microcomputer 20 applies an oscillation pulse to horizontal/vertical circuit 60 so that a sawtoothwave current is generated in horizontal and vertical deflection yokes H-DY and V-DY, respectively, according to the oscillation pulse.

The OSD signal in accordance with signal cable check applied to the CRT 70 is deflected by the horizontal and vertical deflection yokes H-DY and V-DY, respectively, according to the cycle of sawtoothwave current. The deflected signal is displayed on the CRT 70. When the OSD information in accordance with signal cable check displayed on the CRT 70 is confirmed, it is checked whether the signal cable for transmission of the externally applied video signal is precisely connected.

In this state, if the image adjustment pattern is required, the key signal for image adjustment is generated from key panel 10 in step S11. The key signal is received in microcomputer 20 so that the input of key signal is decided in step S14.

If the key signal is determined to be input in step S14, the free running frequency produced in step S12 is converted into the standard mode frequency in step S13. If the frequency conversion is performed in step S13, the standard mode frequency is output in step S14.

The standard mode frequency output in step S14 of microcomputer 20 is sent to step S17 of OSD control circuit 30. In step S17, it is determined whether or not the input frequency is the standard mode frequency. If the result is the standard mode frequency, the OSD gain signal is generated according to the image adjustment pattern in step S16.

The OSD gain signal in accordance with the image adjustment pattern generated in step S16 is output in step S18 and as applied to video mixer 50. Video mixer 50 receives the OSD gain signal in accordance with the image adjustment pattern, and also receives the video data in accordance with the image adjustment pattern generated by microcomputer 20 and processed by signal processing circuit 40. The OSD gain signal and video data are mixed in video mixer 50 and provided as an output to the CRT 70. The CRT 70 receives the signal in accordance with the image adjustment pattern and deflects the oscillation pulse generated by microcomputer 20 according to the sawtoothwave current generated through horizontal/vertical circuit 60 and horizontal and vertical deflection yokes H-DY and V-DY, respectively, thereby displaying the image adjustment pattern.

As a result of display of the image adjustment pattern on the screen of CRT 70 without supply of any external signal, the image adjustment data controlled can be all-mode saved in a new microcomputer which has replaced a failed previous microcomputer so that they are stored inside the microcomputer or an external EEPROM (not shown).

As described above, the present invention generates the standard mode frequency and the image adjustment pattern signal in the microcomputer of a display where no external signal is generated for screen adjustment, thereby maximizing the convenience of image adjustment during servicing.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A circuit for indicating an image adjustment pattern using an on-screen display (OSD), comprising:
    microcomputer means for generating, in the absence of an externally input signal, a free running frequency, and responsive to a key signal input for converting the free running frequency into a standard mode frequency and generating a frequency output and video data according to the frequency converted;
    OSD control circuit means for receiving the frequency output from the microcomputer means, and generating an OSD gain signal in accordance with a signal cable check request and an image adjustment pattern OSD gain signal for indicating the image adjustment pattern according to the frequency output;
    signal processing circuit means for receiving and processing the video data according to the frequency output from the microcomputer means, and thus outputting a video signal; and
    video mixer means for mixing the video signal from the signal processing circuit means and the OSD gain signal generated by the OSD control circuit means, and outputting a signal cable check request video signal and an image adjustment pattern video signal.

2. The circuit as claimed in claim 1, wherein the microcomputer means comprises:
    a free running frequency mode portion for generating the free running frequency in the absence of the externally input signal; and
    a standard mode frequency portion responsive to the key signal input for converting the free running frequency into the standard mode frequency during operation of the free running frequency mode portion.

3. The circuit as claimed in claim 1, wherein the OSD control circuit means comprises:
    a signal cable check portion for processing the frequency output from the microcomputer means, and generating the OSD gain signal in accordance with the signal cable check request; and
    a pattern display portion for processing the standard mode frequency output from the microcomputer means, and generating the image adjustment pattern OSD gain signal.

4. A method for indicating an image adjustment pattern using an on-screen display (OSD), comprising the steps of:
    (a) inputting a key signal for frequency mode conversion;
    (b) generating a free running frequency if there is no external input signal;
    (c) converting the free running frequency generated in step (b) into a standard mode frequency according to the key signal input in step (a);
    (d) controlling steps (b) and (c) according to the presence and absence of the key signal input in step (a) as to selectively output the free running frequency and the standard mode frequency;
    (e) generating an OSD gain signal in accordance with a signal cable check request according to a free running frequency output from step (d);
    (f) generating an OSD gain signal in accordance with an image adjustment pattern according to a standard mode frequency output from step (d); and
    (g) receiving the frequency output from step (d), controlling steps (e) and (f), and selectively generating the OSD gain signal according to the cable check request and the OSD gain signal in accordance with image adjustment pattern.

5. A circuit for indicating an image adjustment pattern using an on-screen display (OSD) comprising:
    microcomputer means for generating a free running frequency in the absence of an externally input signal, and for converting the free running frequency into a standard mode frequency and response to a key signal input, said microcomputer means generating a frequency output and video data;
    OSD control circuit means for receiving frequency output from the microcomputer means and generating an OSD gain signal;
    signal process circuit means for receiving and processing the video data from the microcomputer means, and outputting an video signal; and
    video mixer means for mixing the video signal from the signal processing circuit means and OSD gain signal generated by the OSD control circuit means, and outputting a signal for driving a cathode ray tube (CRT).

6. The circuit as claimed in claim 5, wherein said microcomputer means comprises:
    a free running frequency mode portion for generating the free running frequency in the absence of the externally input signal; and
    a standard mode frequency portion responsive to the key signal input for converting the free running frequency into the standard mode frequency.

7. The circuit as claimed in claim 5, wherein the OSD control circuit means comprises:

a signal cable check portion for processing the frequency output from the microcomputer means, and generating the OSD gain signal in accordance with a signal cable check request; and a pattern display portion for processing the standard mode frequency from the microcomputer means, and generating an image adjustment pattern OSD gain signal.

8. A circuit for indicating an image adjustment pattern using an on-screen display (OSD) comprising:

microcomputer means for generating a frequency output and video data;

OSD control circuit means for receiving the frequency output from the microcomputer means and generating an OSD gain signal in accordance with a signal cable check request, and generating an image adjustment pattern OSD gain signal for indicating the image adjustment pattern according to frequency output;

signal processing circuit means for receiving and processing the video data according to the frequency output from the microcomputer means, and output a video signal; and video mixer means for mixing the video signal from the signal processing circuit means and OSD gain signal generating by the OSD control circuit means, and outputting a signal cable check request video signal and an image adjustment pattern video signal.

9. The circuit as claimed in claim 8, wherein said microcomputer means comprises:

a free running frequency mode portion for generating a free running frequency in the absence of an externally input signal; and a standard mode frequency portion responsive to a key signal input for converting the free running frequency into a standard mode frequency.

10. The circuit as claimed in claim 8, wherein the OSD control circuit means comprises:

a signal cable check portion for processing the frequency output from the microcomputer means, and generating the OSD gain signal in accordance with a signal cable check request; and a pattern display portion for processing the frequency output from the microcomputer means, and generating an image adjustment pattern OSD gain signal.

11. A method for indicating an image adjustment pattern using an on-screen display (OSD) comprising the steps of:

inputting a key signal;

generating a free running frequency if there is no external input signal;

converting the free running frequency into a standard mode frequency in accordance with the key signal input;

selectively outputting the free running frequency and the standard mode frequency in accordance with the absence and presence, respectively, of the key signal input.

12. The method as claimed in claim 11, further comprising the step of generating an OSD gain signal in accordance with a signal cable check request according to a free running frequency output.

13. The method as claimed in claim 11, further comprising the step of generating an OSD gain signal in accordance with an image adjustment pattern according to a standard mode frequency output.

14. The method as claimed in claim 11, further comprising the step of selectively generating the OSD gain signal according to a cable check request and an OSD gain signal corresponding to an image adjustment pattern.

\* \* \* \* \*